United States Patent
Ramachandran et al.

(10) Patent No.: US 10,037,285 B2
(45) Date of Patent: Jul. 31, 2018

(54) MULTI-TIERED STORAGE SYSTEMS AND METHODS FOR ADAPTIVE CONTENT STREAMING

(71) Applicant: Georgia Tech Research Corporation, Atlanta, GA (US)

(72) Inventors: Umakishore Ramachandran, Lilburn, GA (US); Mungyung Ryu, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 14/597,193

(22) Filed: Jan. 14, 2015

(65) Prior Publication Data

US 2015/0199138 A1   Jul. 16, 2015

Related U.S. Application Data

(60) Provisional application No. 61/927,009, filed on Jan. 14, 2014.

(51) Int. Cl.
| | |
|---|---|
| *G06F 12/12* | (2016.01) |
| *G06F 12/02* | (2006.01) |
| *G06F 12/08* | (2016.01) |
| *G06F 3/06* | (2006.01) |
| *G06F 12/122* | (2016.01) |
| *G06F 12/0868* | (2016.01) |
| *G06F 12/0897* | (2016.01) |

(52) U.S. Cl.
CPC ........ *G06F 12/122* (2013.01); *G06F 12/0246* (2013.01); *G06F 12/0868* (2013.01); *G06F 12/0897* (2013.01); *G06F 3/064* (2013.01); *G06F 3/0611* (2013.01); *G06F 3/0629* (2013.01); *G06F 2212/214* (2013.01); *Y02B 60/1225* (2013.01); *Y02D 10/13* (2018.01)

(58) Field of Classification Search
CPC .. G06F 3/0611; G06F 12/122; G06F 12/0897; G06F 3/0629; G06F 3/064
See application file for complete search history.

(56) References Cited

U.S. PATENT DOCUMENTS

2006/0195709 A1*  8/2006  Matsumoto ........... G06F 1/3209
                                                        713/300
2008/0104325 A1*  5/2008  Narad ................. G06F 12/0897
                                                        711/122

(Continued)

*Primary Examiner* — Daniel Tsui
*Assistant Examiner* — Masud Khan
(74) *Attorney, Agent, or Firm* — Troutman Sanders LLP; Ryan A. Schneider

(57) ABSTRACT

The disclosed technology includes techniques for efficiently streaming media content from a multi-tiered storage system. An example implementation may be used for adaptive HTTP streaming of video segments and other content. In some implementations, flash memory SSDs (SLC or MLC) may form an intermediate cache layer between a first layer of DRAM cache and third layer of HDDs. Significant architectural elements of various implementations include optimal write granularity to overcome the write amplification effect of flash memory SSDs and a QoS-sensitive caching strategy that monitors the activity of the flash memory SSDs to ensure that video streaming performance is not hampered by the caching activity.

16 Claims, 11 Drawing Sheets

(56) References Cited

U.S. PATENT DOCUMENTS

| | | | |
|---|---|---|---|
| 2010/0211731 A1* | 8/2010 | Mittendorff | G06F 12/0866 711/113 |
| 2014/0019707 A1* | 1/2014 | Benhase | G06F 12/023 711/171 |
| 2014/0115235 A1* | 4/2014 | Ito | G06F 12/0868 711/103 |
| 2015/0039831 A1* | 2/2015 | Auvenshine | G06F 3/0643 711/118 |

* cited by examiner

Latency sequence for sequential writes

Latency CDF for sequential writes

Latency sequence for random writes

Latency CDF for random writes

Latency CDF for sequential writes

Latency CDF for random writes

Latency sequence for sequential writes

Latency sequence for random writes

Block #0

- 611 Super Record
- 621 Record 1
- 621 Record 2
- 621 Record 3

612 Block Size
613 Checksum

Record expands to:
- 622 Segment Id
- 623 Number of Chunks
- 624 Chunk Sequence Number
- 625 Chunk Size
- 626 Chunk Data
- 627 Checksum

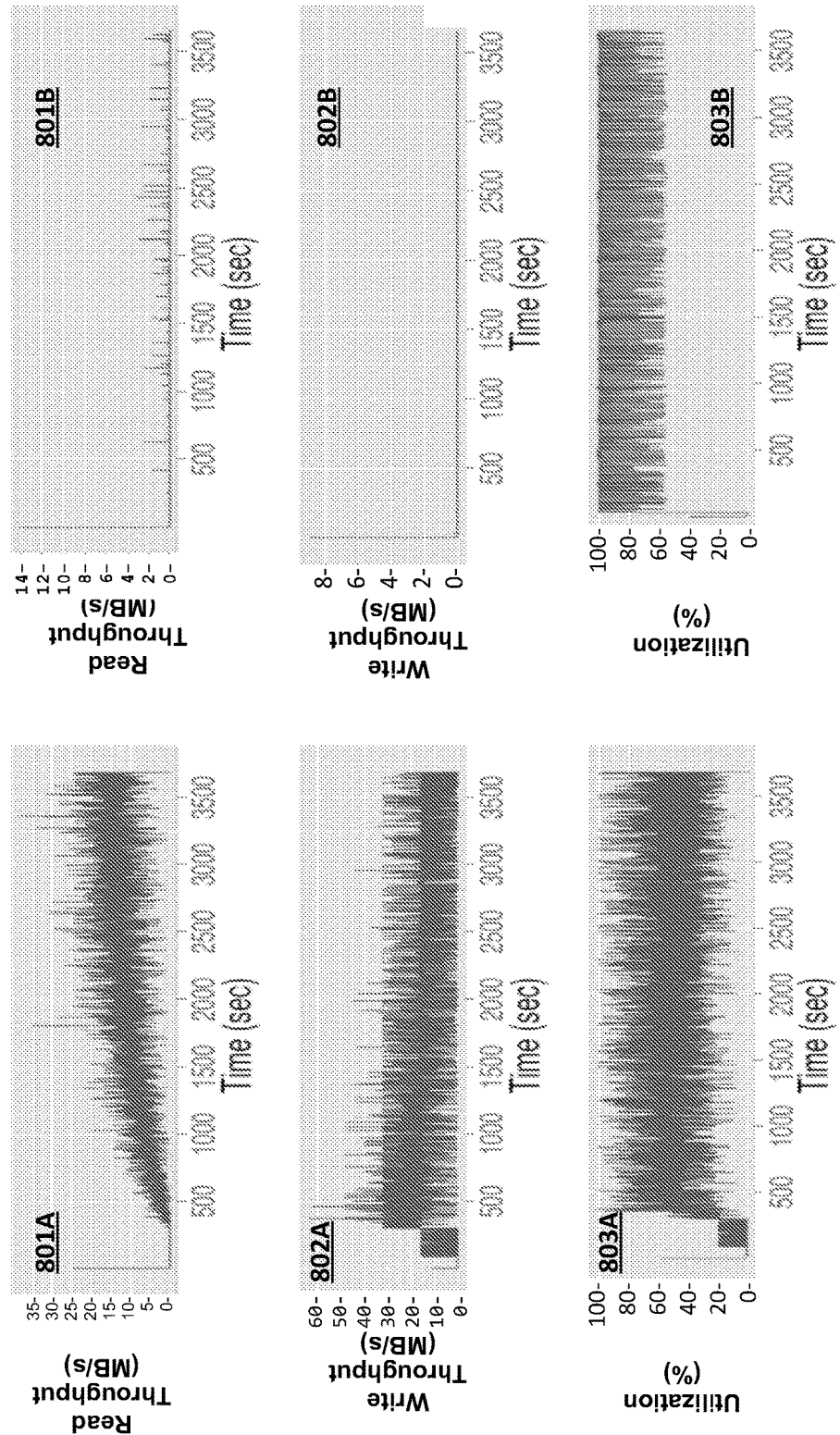

MULTI-TIERED STORAGE SYSTEMS AND METHODS FOR ADAPTIVE CONTENT STREAMING

CROSS-REFERENCE TO RELATED APPLICATIONS

This application claims priority to, and the benefit under 35 U.S.C. § 119(e), of U.S. Provisional Patent Application No. 61/927,009, filed 14 Jan. 2014, the entire contents and substance of which are hereby incorporated by reference as if fully set forth below.

STATEMENT REGARDING FEDERALLY SPONSORED RESEARCH OR DEVELOPMENT

This invention was made with United States Government support under National Science Foundation Grant No. CNS1218520. The United States Government has certain rights to this invention.

BACKGROUND

Adaptive HTTP streaming (AHS) is a new paradigm for streaming video over the web currently being used by many major content distributors. AHS is not dependent on specialized video servers; instead, AHS may exploit off-the-shelf web servers. Advantages of this approach include compatibility with the widely deployed content distribution network (CDN) infrastructure for the scalable video streaming service, and simplification of firewall and NAT traversal problems. On the other hand, a weakness is that there may be no QoS mechanism on the server side to guarantee video delivery. Instead, AHS may be reliant on the large resource provisioning (i.e., CPU, RAM, storage capacity, storage and network bandwidth, etc.) that is customary with CDNs. Thus, this approach may achieve simple system design, scalability, and jitter-free video streaming at the cost of large resource over-provisioning.

A video streaming system typically requires a large number of HDDs both for capacity (i.e., to store the video library) and for bandwidth (i.e., to serve the video library). While the cost per gigabyte of HDDs has decreased significantly over the last two decades, the cost per bits-per-second of HDDs has not. Moreover, an array of HDDs can consume a lot of power (approx. 5-15 watts per drive) while also generating a large amount of heat. Accordingly, even more power may be required to cool the data center hosting the array of HDDs. Thus, the cost of storage for a large-scale service may be significant. At the same time, the amount of user generated content (UGC) and the corresponding number of viewers is increasing explosively on the web. For these reasons, the storage component of video streaming systems needs improved throughput, lower power consumption, and lower cooling costs.

Solid-state drives (SSD) are a new storage technology that is comprised of semiconductor memory chips (e.g., DRAM, Flash Memory, Phase Change Memory) for storing and retrieving data rather than using the traditional spinning platters, motor, and moving heads found in conventional magnetic disks drives. Among the various types of SSDs, flash-based SSDs currently have the most penetration in modern computer systems. The advantages of flash-based SSDs are fast random read, low power consumption (approx. 0.1-1.3 watts per drive), and low heat dissipation due to the absence of the mechanical components. On the other hand, the high cost per gigabyte compared to magnetic disks, poor small random write performance, and limited lifetime are major concerns with SSDs as compared to conventional HDDs. Moreover, despite the increasing affordability of SSDs, the ratio of capacity costs of SSD to HDD is expected to remain fairly constant in the future since the bit density of HDDs is also continuously improving.

A viable hybrid architecture of increasing interest is to use flash-based SSDs as an intermediate level between RAM and HDDs for caching hot contents. An interesting characteristic of video service is that often only a small number of videos relative to the entire collection are accessed frequently. Therefore, frequently accessed hot contents can be served using flash-based SSDs and cold contents served by slow HDDs, with the entire video library also stored in the HDDs. In this way, a high-performance Video-on-Demand (VoD) system may be built cost-effectively.

SUMMARY

The above needs and others may be addressed by certain implementations of the disclosed technology. Certain implementations include techniques for efficiently streaming media content from a multi-tiered storage system.

According to an implementation, a system is provided. The system may include a plurality of storage levels, and a processor operatively coupled to the plurality of storage levels. The plurality of storage levels may include a RAM buffer pool embodied in a first level of RAM cache, an SSD buffer pool embodied in a second level of SSD cache, and a third level of HDD storage. The RAM buffer pool may include an array of memory blocks of various sizes, each block storing data for a media segment file. The SSD cache be associated with an address space that is defined by equal-sized blocks of an optimal block size associated with the SSD cache. Moreover, write operations to the SSD cache may be limited to requests at multiples of the optimal block size and aligned on a block boundary associated with the SSD cache.

In some implementations, the system may be configured wherein media segment requests that miss the RAM cache and SSD cache are served by the HDD storage. The system may be further configured wherein media segments read from the HDD storage are output to the RAM buffer pool and returned to the processor. The system may yet be further configured wherein media segments read from the SSD are not inserted into the RAM buffer pool but are returned to the processor.

According to another example implementation, a method is provided. The method may include determining, experimentally by a processor, an optimal block size associated with an SSD. In a further implementation, determining the optimal block size may include outputting a first group of random write commands of a first size to the SSD and a second group of sequential write commands of the first size to the SSD. The optimal block size may then be determined by comparing the latency distributions associated with the respective groups of write commands. In some implementations, the latency distributions may be compared based on Kullback-Leibler divergence.

The method may further include defining a logical address space associated the SSD with allocation blocks of a same size as the optimal block size. The method may yet further include performing, by the processor, one or more writes to flash memory, each write being at or multiples of the optimal block size and aligned on a block boundary associated with the SSD.

According to another example implementation, a computer program product is provided. The computer program product may be embodied in a non-transitory computer-readable medium, and may store instructions that, when executed by a processor of a computing device, causes the computing device to perform a method substantially similar the above-described method.

Other implementations, features, and aspects of the disclosed technology are described in detail herein and are considered a part of the claimed disclosed technology. Other implementations, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein:

FIG. 6 depicts an illustration 601 of the data structure of an SSD block, according to an example implementation.

FIGS. 8A-B depict illustrations of the effect of optimal (801A) and non-optimal (801B) block sizes on read throughput, write throughput, and utilization of the SSD, according to an example implementation.

DETAILED DESCRIPTION

Figure 1A:
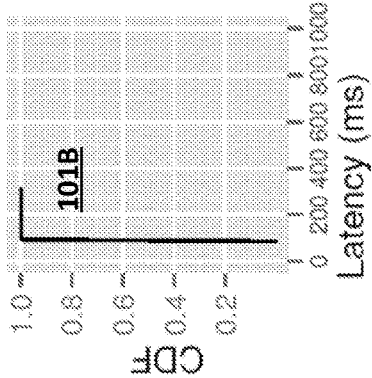
FIGS. 1A-D depict illustrations of latency over 640 write operations for sequential (101A-B) and random workloads (101C-D) when the request size is 8 MB for a particular SSD, according to an example implementation.

Some implementations of the disclosed technology include novel techniques for efficiently streaming media content from a multi-tiered storage system. For example, the present disclosure introduces a novel multi-tiered storage architecture incorporating flash memory SSDs and well suited to the needs of adaptive HTTP streaming (AHS). This implementation and others are herein referred to herein as "FlashStream."

Various implementations of FlashStream were designed with one or more of the following guidelines in mind for providing high-performance multi-tiered video storage systems using flash memory SSDs: First, while low-end flash memory SSDs may be well suited to serve the caching needs of videos in an HTTP streaming server, small random writes to the flash memory SSDs should be avoided due to the unique performance characteristics of flash memory. Second, SSD write operations should avoid the critical path of serving missed video segments (brought from the hard disk) to the clients. Third, SSD read operations should have higher priority than SSD write operations because the former needs to be served before their deadline to the clients, while the latter is not time critical. An example implementation of FlashStream may meet or address these guidelines, respectively, as follows:

1. Write amplification may be minimized by requesting data segments at the granularity of an optimal block size and aligned on the optimal block size. A novel reverse-engineering technique is disclosed herein for identifying the optimal block size for any flash-based SSDs.

2. Utilization-aware SSD admission and ring buffer mechanisms may control the write request rate to SSDs and give higher priority to read requests. An evict-ahead policy may be adopted to avoid SSD write operations from the critical path of serving missed data.

3. Metadata for video segments may be embedded in the SSD blocks to restore quickly data in SSD upon power failure.

Some implementations of the disclosed technology will be described more fully hereinafter with reference to the accompanying drawings. This disclosed technology may, however, be embodied in many different forms and should not be construed as limited to the implementations set forth therein.

In the following description, numerous specific details are set forth. However, it is to be understood that implementations of the disclosed technology may be practiced without these specific details. In other instances, well-known methods, structures, and techniques have not been shown in detail in order not to obscure an understanding of this description. References to "one implementation," "an implementation," "example implementation," "some implementations," "certain implementations," "various implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

Unless otherwise specified, the use of the ordinal adjectives "first," "second," "third," etc., to describe a common object, merely indicate that different instances of like objects are being referred to, and are not intended to imply that the objects so described should be in a given sequence, either temporally, spatially, in ranking, or in any other manner.

In some instances, a computing device may be referred to as a mobile device, mobile computing device, a mobile station (MS), terminal, cellular phone, cellular handset, personal digital assistant (PDA), smartphone, wireless phone, organizer, handheld computer, desktop computer, laptop computer, tablet computer, set-top box, television, appliance, game device, medical device, display device, or some other like terminology. In other instances, a computing device may be a processor, controller, or a central processing unit (CPU). In yet other instances, a computing device may be a set of hardware components.

Various aspects described herein may be implemented using standard programming or engineering techniques to produce software, firmware, hardware, or any combination thereof to control a computing device to implement the disclosed subject matter. A computer-readable medium may include, for example: a magnetic storage device such as a hard disk, a floppy disk or a magnetic strip; an optical storage device such as a compact disk (CD) or digital versatile disk (DVD); a smart card; and a flash memory device such as a card, stick or key drive, or embedded component. Additionally, it should be appreciated that a carrier wave may be employed to carry computer-readable electronic data including those used in transmitting and receiving electronic data such as electronic mail (e-mail) or in accessing a computer network such as the Internet or a local area network (LAN). Of course, a person of ordinary skill in the art will recognize many modifications may be made to this configuration without departing from the scope or spirit of the claimed subject matter.

Various systems, methods, and computer-readable mediums are disclosed for efficiently streaming media content from a multi-tiered storage system, and will now be described with reference to the accompanying figures.

Figure 10:
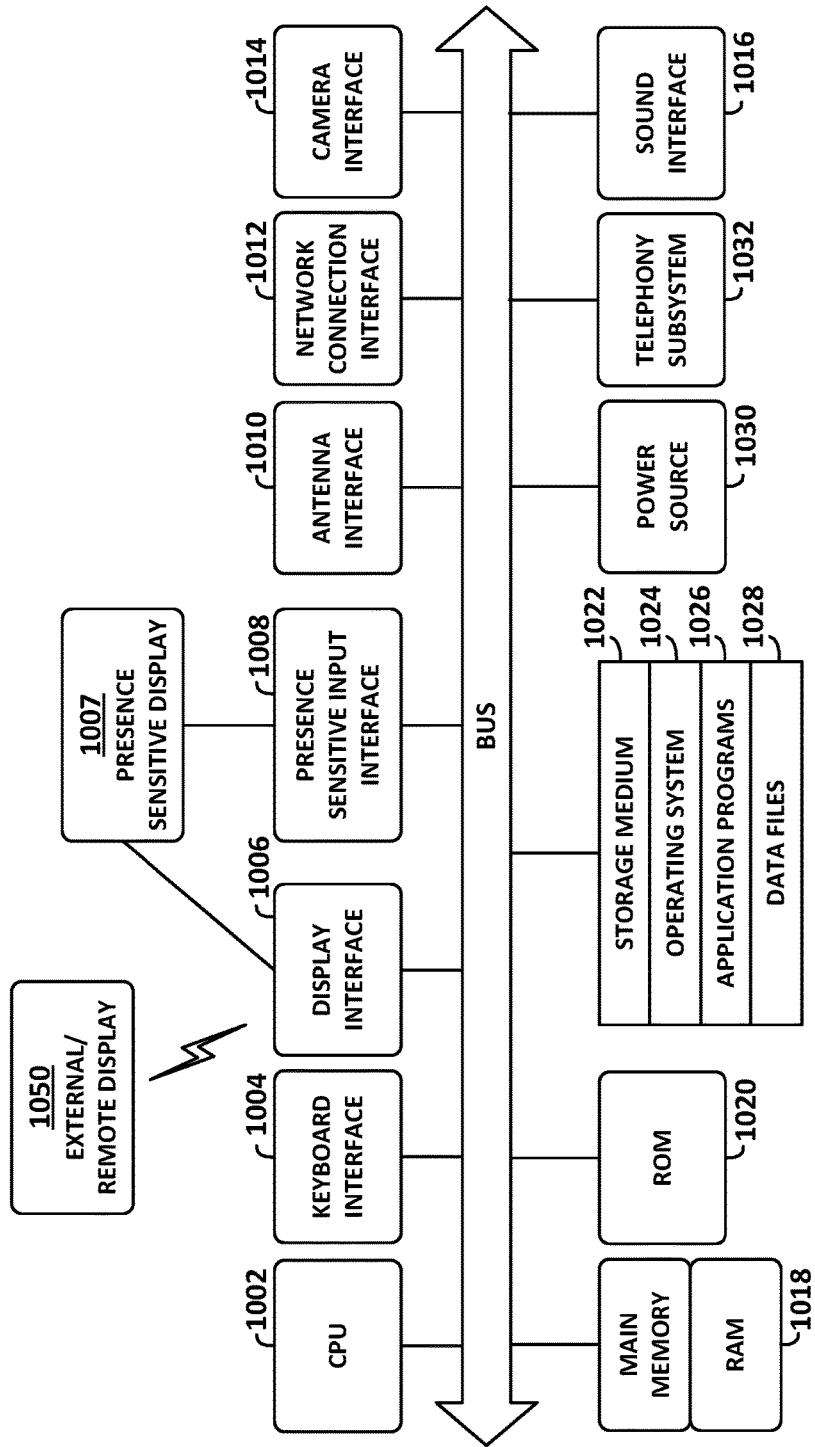
FIG. 10 depicts a block diagram of illustrative computing device architecture 1000, according to an example implementation.

FIG. 10 depicts a block diagram of illustrative computing device architecture 1000, according to an example implementation. Certain aspects of FIG. 10 may be embodied in a computing device 200 (for example, a mobile computing device). As desired, implementations of the disclosed technology may include a computing device with more or less of the components illustrated in FIG. 10. It will be understood that the computing device architecture 1000 is provided for example purposes only and does not limit the scope of the various implementations of the present disclosed systems, methods, and computer-readable mediums.

The computing device architecture 1000 of FIG. 10 includes a CPU 1002, where computer instructions are processed; a display interface 1006 that acts as a communication interface and provides functions for rendering video, graphics, images, and texts on the display. In certain implementations of the disclosed technology, the display interface 1006 may be directly connected to a local display, such as a touch-screen display associated with a mobile computing device. In another example implementation, the display interface 1006 may be configured for providing data, images, and other information for an external/remote display that is not necessarily physically connected to the mobile computing device. For example, a desktop monitor may be utilized for mirroring graphics and other information that is presented on a mobile computing device. In certain some implementations, the display interface 1006 may wirelessly communicate, for example, via a Wi-Fi channel or other available network connection interface 1012 to the external/remote display.

In an example implementation, the network connection interface 1012 may be configured as a communication interface and may provide functions for rendering video, graphics, images, text, other information, or any combination thereof on the display. In one example, a communication interface may include a serial port, a parallel port, a general purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof.

The computing device architecture 1000 may include a keyboard interface 1004 that provides a communication interface to a keyboard. In one example implementation, the computing device architecture 1000 may include a presence-sensitive display interface 1007 for connecting to a presence-sensitive display. According to certain some implementations of the disclosed technology, the presence-sensitive display interface 1007 may provide a communication interface to various devices such as a pointing device, a touch screen, a depth camera, etc. which may or may not be associated with a display.

The computing device architecture 1000 may be configured to use an input device via one or more of input/output interfaces (for example, the keyboard interface 1004, the display interface 1006, the presence sensitive display interface 1007, network connection interface 1012, camera interface 1014, sound interface 1016, etc.) to allow a user to capture information into the computing device architecture 1000. The input device may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, and the like. Additionally, the input device may be integrated with the computing device architecture 1000 or may be a separate device. For example, the input device may be an accelerometer, a magnetometer, a digital camera, a microphone, and an optical sensor.

Example implementations of the computing device architecture 1000 may include an antenna interface 1010 that provides a communication interface to an antenna; a network connection interface 1012 that provides a communication interface to a network. In certain implementations, a camera interface 1014 is provided that acts as a communication interface and provides functions for capturing digital images from a camera. In certain implementations, a sound interface 1016 is provided as a communication interface for converting sound into electrical signals using a microphone and for converting electrical signals into sound using a speaker. According to example implementations, a random access memory (RAM) 1018 is provided, where computer instructions and data may be stored in a volatile memory device for processing by the CPU 1002.

According to an example implementation, the computing device architecture 1000 includes a read-only memory (ROM) 1020 where invariant low-level system code or data for basic system functions such as basic input and output (I/O), startup, or reception of keystrokes from a keyboard are stored in a non-volatile memory device. According to an example implementation, the computing device architecture 1000 includes a storage medium 1022 or other suitable type of memory (e.g., RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system (OS) 1024, application programs 1026 (including, for example, a web browser application, a widget or gadget engine, and or other applications, as necessary) and data files 1028 are stored. According to an example implementation, the computing device architecture 1000 includes a power source 1030 that provides an appropriate alternating current (AC) or direct current (DC) to power components. According to an example implementation, the computing device architecture 1000 includes a telephony subsystem 1032 that allows the device 1000 to transmit and receive sound over a telephone network. The constituent devices and the CPU 1002 communicate with each other over a bus 1034.

According to an example implementation, the CPU 1002 has appropriate structure to be a computer processor. In one arrangement, the CPU 1002 may include more than one processing unit. The RAM 1018 interfaces with the computer bus 1034 to provide quick RAM storage to the CPU 1002 during the execution of software programs such as the operating system application programs, and device drivers. More specifically, the CPU 1002 loads computer-executable process steps from the storage medium 1022 or other media into a field of the RAM 1018 in order to execute software programs. Data may be stored in the RAM 1018, where the data may be accessed by the computer CPU 1002 during execution. In one example configuration, the device architecture 1000 includes at least 1025 MB of RAM, and 256 MB of flash memory.

The storage medium 1022 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow a computing device to access computer-executable process steps, application programs and the like, stored on removable and non-removable memory media, to off-load data from the device or to upload data onto the device. A computer program product, such as one utilizing a communication system may be tangibly embodied in storage medium 1022, which may comprise a machine-readable storage medium.

According to one example implementation, the term computing device, as used herein, may be a CPU, or conceptualized as a CPU (for example, the CPU 1002 of FIG. 10). In this example implementation, the computing device may be coupled, connected, and/or in communication with one or more peripheral devices, such as display. In another example implementation, the term computing device, as used herein, may refer to a mobile computing device, such as a smartphone or tablet computer. In this example implementation, the computing device may output content to its local display and/or speaker(s). In another example implementation, the computing device may output content to an external display device (e.g., over Wi-Fi) such as a TV or an external computing system.

In some implementations of the disclosed technology, the computing device may include any number of hardware and/or software applications that are executed to facilitate any of the operations. In some implementations, one or more I/O interfaces may facilitate communication between the computing device and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the computing device. The one or more I/O interfaces may be utilized to receive or collect data and/or user instructions from a wide variety of input devices. Received data may be processed by one or more computer processors as desired in various implementations of the disclosed technology and/or stored in one or more memory devices.

One or more network interfaces may facilitate connection of the computing device inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth enabled network, a Wi-Fi® enabled network, a satellite-based network any wired network, any wireless network, etc., for communication with external devices and/or systems, for example, via public cloud service.

Introduction

Flash memories, including NAND and NOR types, have a common physical restriction, namely, they must be erased before being written. Flash memory can be written or read a single page at a time, but it has to be erased in an erase block unit. An erase block consists of a certain number of pages. In NAND flash memory, a page is similar to a HDD sector, and its size is usually 2 to 4 KBytes, while an erase block is typically 128 pages or more. Flash memory also suffers from a limitation on the number of erase operations possible for each erase block. In SLC NAND flash memory, the expected number of erasures per block may be 100,000, but in two-bit MLC NAND flash memory, only 10,000.

An SSD may be simply a set of flash memory chips packaged together with additional circuitry and a special piece of software called the Flash Translation Layer (FTL). The additional circuitry may include a RAM buffer for storing meta-data associated with the internal organization of the SSD and a write buffer for optimizing the write performance of the SSD. To avoid erasing and re-writing an entire block for every page modification, an FTL may write data out-of-place, remapping the logical page to a new physical location and marking the old page invalid. This may require maintaining some amount of free blocks into which new pages can be written. These free blocks may be maintained by erasing previously written blocks to allow space occupied by invalid pages to be made available for new writes. This process is called garbage collection.

The FTL may try to run garbage collection in the background as much as possible while the foreground I/O requests are idle, but it is not guaranteed, especially when a new clean block is needed instantly to write a new page. Due to random writes emanating from the upper layers of the operating system, a block may have valid pages and invalid pages. Therefore, when the garbage collector reclaims a block, the valid pages of the block need to be copied to another block. Thus, an external write may generate some additional unrelated writes internal to the device, a phenomenon referred to as write amplification.

Finding the Optimal Block Size

Significant reasons for the poor performance of flash memory for small random writes include: (a) a block has to be erased before a page within it can be written, and (b) an erase block consists of several pages, valid pages in the block being erased must be copied to other clean pages before erasing the block (write amplification), and page write and block erasure are inherently slow operations. Due to the write amplification effect, small random writes may not only degrade the SSD performance but also reduce the flash memory lifetime.

One way to reduce or eliminate both "write amplification" and poor performance due to random page writes is to ensure that write requests to the SSD are always in multiples of the block size of the flash memory that is used in the SSD, and that the writes are aligned on block boundaries. This strategy may also have the additional benefit of fast garbage collection (due to the elimination of write amplification) and longer flash memory lifetime. However, there is a catch: SSD manufacturers put great efforts into fully exploiting all available hardware resources and features to improve performance, and they use different and sometimes incompatible designs. In addition, the internal organization of SSDs and their techniques are typically proprietary and not readily available.

In order to select the correct write granularity in the software architecture of the storage system without knowing the internal architecture of the SSD, the optimal block size for write requests to the SSD may be defined as the minimum write size that makes the random write performance similar to the sequential write performance. To determine the optimal block a reverse-engineering process may be performed on any flash-based SSD. The idea is to perform random writes with different request sizes until the performance matches that with a sequential workload.

Figure 1B:
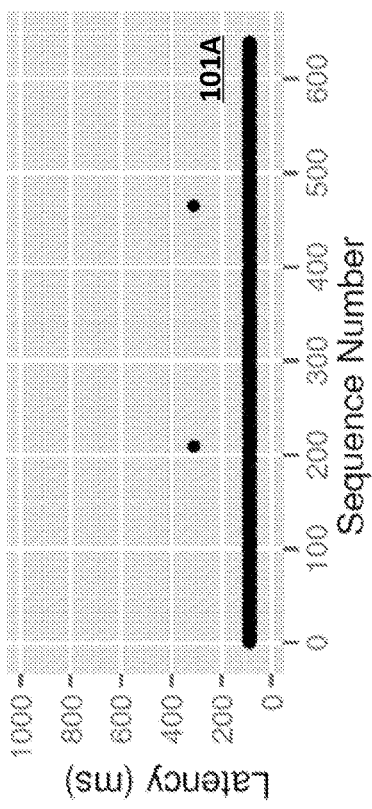
Figure 1C:
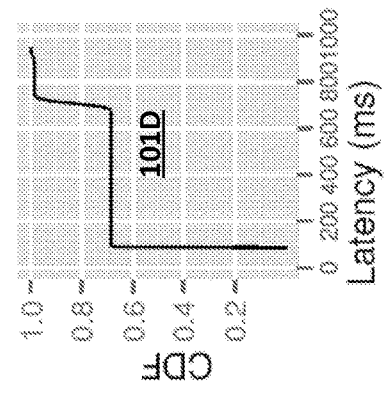
Figure 1D:
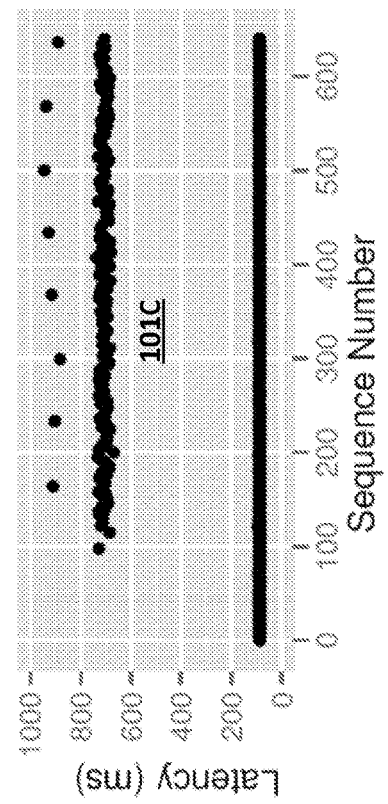
Figure 2B:
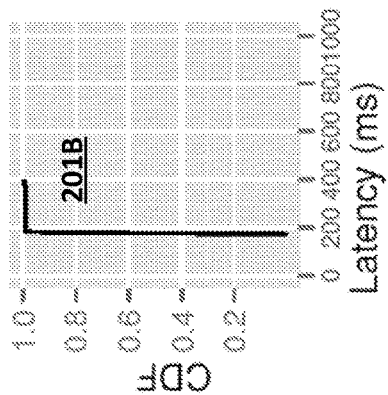
FIGS. 2A-D depict illustrations of latency over 640 write operations for sequential (201A-B) and random workloads (201C-D) when the request size is 16 MB for the same SSD as FIG. 1, according to an example implementation.
Figure 2D:
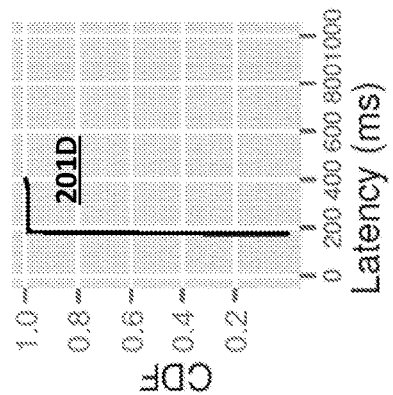
Figure 2A:
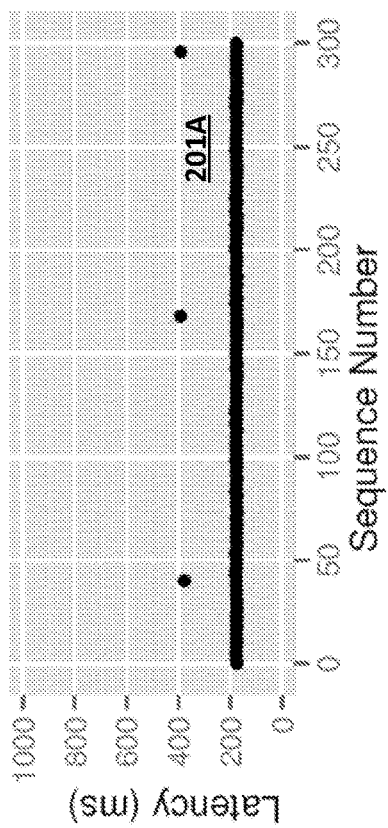
Figure 2C:
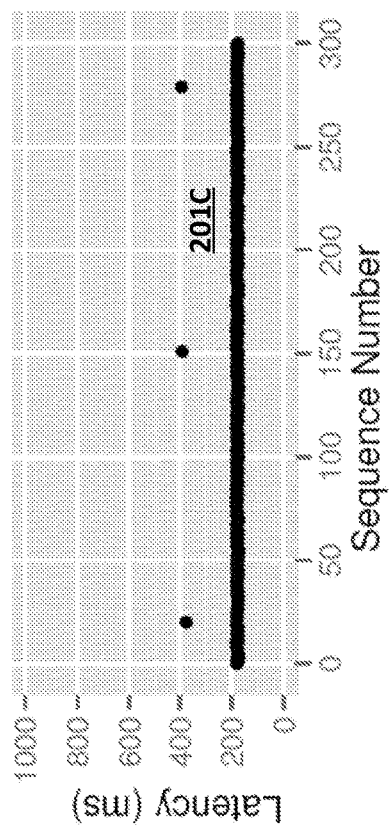

FIGS. 1A-D depict illustrations of latency over 640 write operations for sequential (101A-B) and random workloads (101C-D) when the request size is 8 MB for a particular SSD, according to an example implementation. To illustrate the technique, an OCZ Core V2 flash-based SSD was used. For the random writes (see FIG. 1C), frequent high latencies (i.e., 800-1000 ms) may be noticed due to the write amplification effect. On the other hand, when the request size is 16 MB (see FIG. 2), the latency distributions for the sequential write and the random write workloads are very similar. FIGS. 1B and 1D show the CDF graphs for the 8 MB request size; FIGS. 2B and 2D show the CDF graphs for the 16 MB request size. While the CDF graphs are useful to appreciate visually the similarity of two distributions, a quantitative measure may be used to determine conclusively the similarity.

Kullback-Leibler (KL) divergence is a fundamental equation from information theory that quantifies the proximity of two probability distributions: the smaller the KL value the more similar the two distributions. In flash memory SSDs, write operation latency is a random variable and may be hard to estimate because it is affected by various factors such as mapping status, garbage collection, and wear-leveling. The KL divergence value may be used as the metric for comparing the similarity of the latency distributions obtained with the sequential and random write workloads.

Figure 3A:
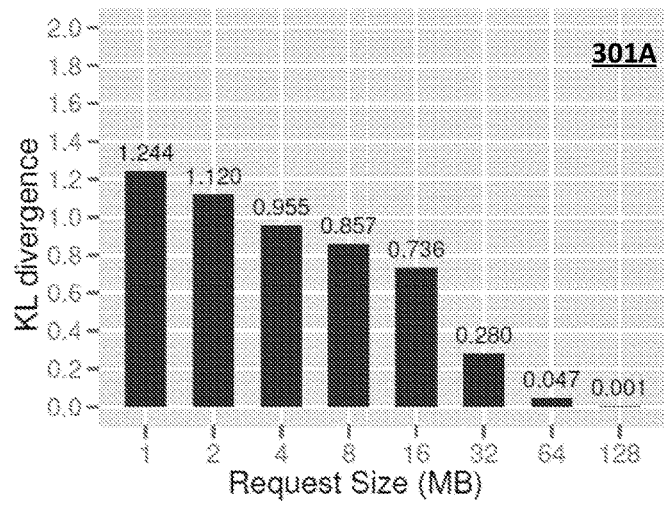
FIGS. 3A-C depict illustrations 301A-C of KL divergence values for various request sizes and SSDs, according to an example implementation.
Figure 3B:
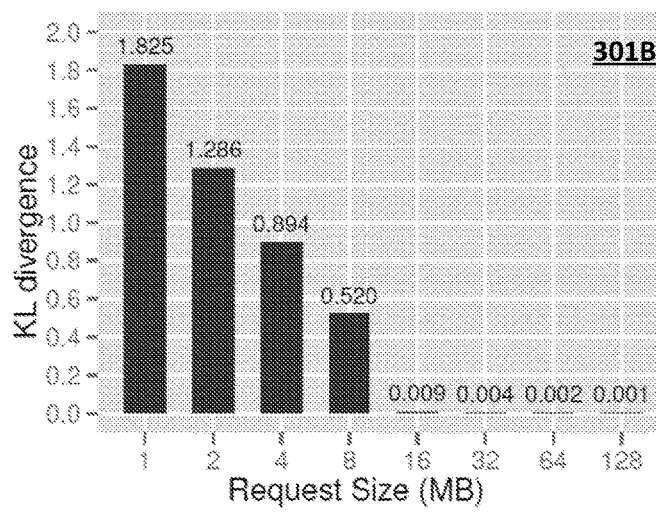
Figure 3C:
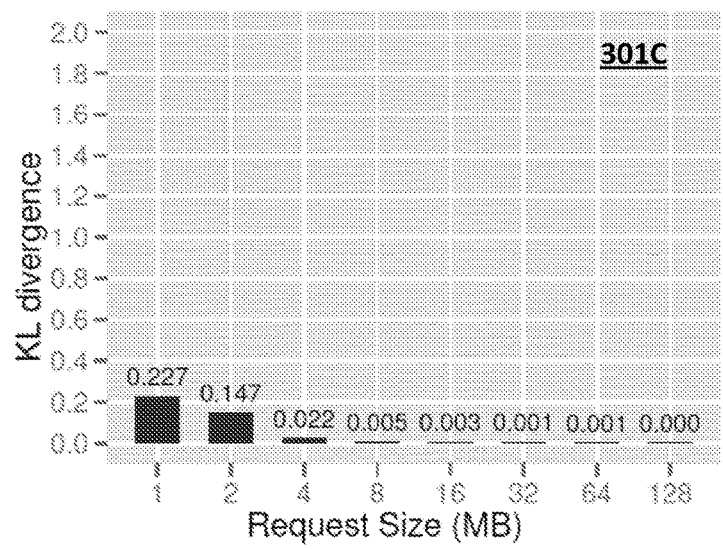

FIGS. 3A-C depict illustrations 301A-C of KL divergence values for various request sizes and SSDs, according to an example implementation. For all the SSDs, the KL divergence value converges to zero as the request size increases. The optimal block size may be the request size where the KL divergence value becomes lower than a threshold that is close to zero. This threshold may be a configuration parameter. A lower threshold may give a block size that shows more similar latency between sequential writes and random writes. For the testing described herein, 0.1 was chosen for the threshold because the KL divergence value quickly converged to zero once it becomes lower than 0.1. Therefore, 64 MB was determined as the optimal block size for INTEL X25-M G1, 16 MB for OCZ Core V2, and 4 MB for SAMSUNG SLC MCCOE64G5MPP.

The optimal block size may be a function of the internal architecture of the SSD (page size, block size, available internal parallelism for access to the flash memory chips, etc.). However, this experimental methodology allows reverse-engineering and selection of a write size that is most appropriate for a given SSD. According to certain implementations, once the optimal block size has been determined, FlashStream may divide the logical address space of flash memory into identical allocation blocks that are of the same size as the optimal block size determined with the experimental methodology.

System Design

Figure 4:
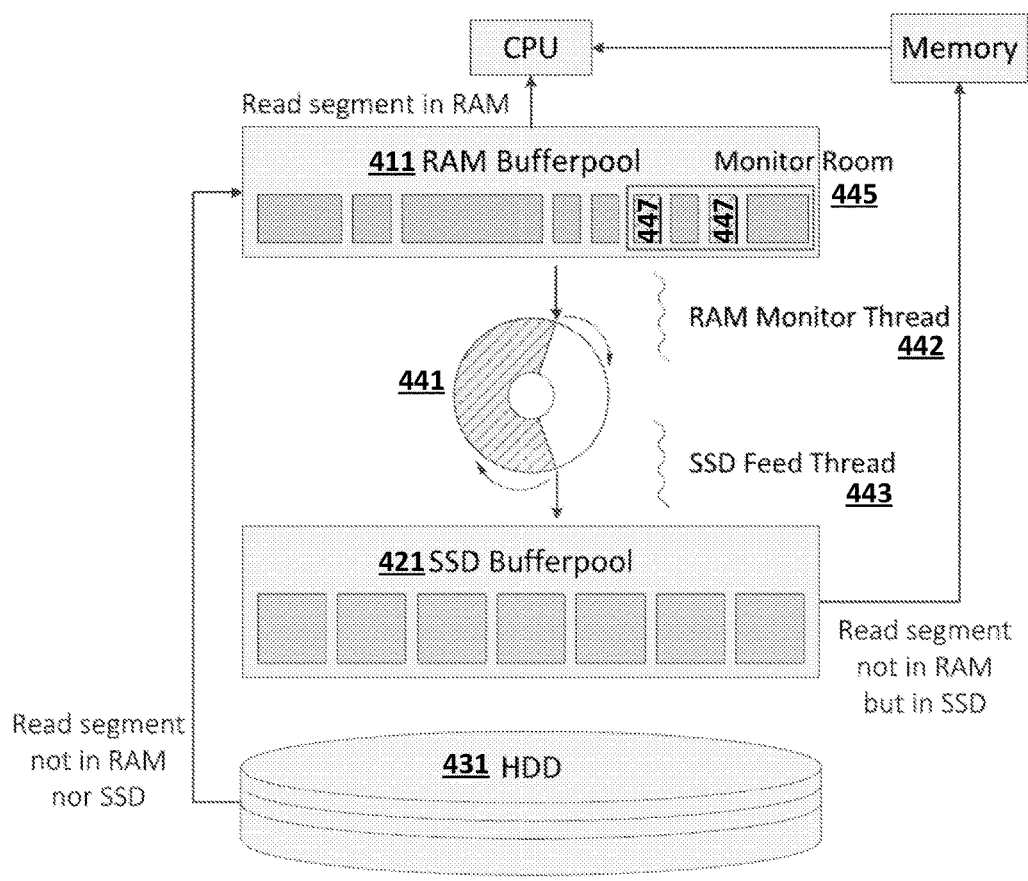
FIG. 4 depicts an illustration of FlashStream architecture 400, according to an example implementation.

In adaptive HTTP streaming systems, a segment is a basic unit for accessing videos. Accordingly, some implementations of FlashStream may organize its storage structure at segment granularity. One of skill in the art will appreciate that certain implementations will be applicable to other forms and divisions of streamable data such as audio segments. FIG. 4 depicts an illustration of FlashStream architecture 400, according to an example implementation. The first cache layer is a RAM cache. The RAM buffer pool is an array of memory blocks, and each block stores data for a video segment file. Because segments may have different sizes, the size of each block in the RAM buffer pool may be different.

In some implementations, the second cache layer is an SSD cache. The SSD's address space may be divided into equal-sized blocks (same as the optimal block size). All write operations to the SSD may be requested with the optimal block size aligned on the block boundary. All segment requests that miss the two caches may be served by disks (e.g., HDDs). The segments read from the disks may be pushed into the RAM buffer pool, and then they returned to the CPU. On the other hand, the segments read from the SSD may not be inserted into the first-level cache (RAM buffer pool) but are directly returned to the CPU (i.e., DMA'ed into its memory). In this way, the capacity of the first level RAM cache and the second-level SSD cache may be increasingly or maximally utilized because the same segment avoids being stored in both levels.

One design goal is to reduce or minimize I/O requests sent to the disks since the hard disk is likely the slowest element in the hierarchy of FlashStream, and thus could hurt real-time streaming performance. By storing data either in the DRAM or the SSDs (but not both), some implementations of FlashStream may improve or maximize the cumulative cache hit ratio in the first two levels and minimizes the read requests sent to the disks. In other implementations, however, a same data segment may exist on both the DRAM and the SSDs.

RAM Buffer Pool

According to certain implementations, the RAM buffer pool may be the first-level in a three-level hierarchy of FlashStream. Segments cached in the buffer may be ordered according to the replacement policy used. For example, when a least recently used (LRU) replacement policy is employed, the most recently used segment should be at the head of the buffer pool and the least recently used segment should be at the tail. LRU may be the default replacement policy for the RAM buffer pool because it is simple and works well in most cases. However, it should be noted that other replacement policies (such as LRU-Min and GDS) could be easily used for the RAM buffer pool without affecting the design decisions in the other components of FlashStream.

According to certain implementations, whenever a new segment is inserted into the pool and the pool has insufficient space, segments at the end of the pool may be evicted until the pool has space to host the new segment. A RAM monitor thread 442 may periodically monitor the tail part of the RAM buffer pool 411 (see FIG. 4). This tail portion of the pool is referred to herein as the "monitor room" 445. The size of the monitor room may be a system configuration parameter. In an example implementation, 10% of the total number of segments in the RAM buffer pool is used for the monitor room size by default.

According to certain implementations, when the thread identifies segments in the monitor room 445 that are not in the SSD cache, then those segments may be copied to a ring buffer 441. In FIG. 4, such segments are shown as shaded squares 447 in the monitor room. Segments that are in the ring buffer are candidates for being written into the second level cache. The monitor thread may simply throw away the segments in the monitor room to make room for new segments coming from the disk 431 even if they have not been copied into the ring buffer by the monitor thread 442. This may be similar to, but not the same as, the evict-ahead policy used in the ZFS file system. In some implementations, it is assumed that the video data is immutable and thus read-only (e.g., DB of movies stored at Netflix). When a video object is updated (e.g., new version of a movie is distributed to the CDN servers by the content provider), the cached copies of the segments pertaining to the old version of the video object may simply be removed from the memory hierarchy of FlashStream. This is typically an out-of-band administrative decision outside the normal operation of FlashStream and may not interfere with the evict-ahead policy for managing the buffer pool.

An advantage of the evict-ahead policy is that it can avoid flash write operations from the critical path for handling cache miss. On the other hand, a drawback of the evict-ahead policy may be that there is no guarantee that the evicted segments will be written to the second level cache (i.e., SSD). When a segment misses both the RAM and SSD caches, it may be read from the disks 431 and placed in the RAM buffer pool 411. A thread that is inserting a segment into the RAM buffer pool may not have to wait for a victim segment (in the monitor room 445) to be copied into the ring buffer 441 (for writing eventually to the SSD). A goal is that the victim would have already been copied into the ring buffer by the monitor thread 442 ahead of time.

SSD Buffer Pool

According to certain implementations, segments that are to be written to the SSD may be buffered in the ring buffer 441 between the RAM buffer pool 411 and the SSD buffer pool 421. While the RAM monitor thread fills up the ring buffer, an SSD feed thread 443 may consume the ring buffer and write data to the SSD in units of the optimal block size. In addition, the SSD feed thread may employ a simple admission mechanism: For a video streaming system, read operations have higher priority than write operations. Therefore, when the SSD is busy for serving read requests, the SSD feed thread should avoid making write requests to the SSD. The admission mechanism is detailed later herein. If the second-level cache (SSD) is full, the victim block chosen for eviction from the SSD may be simply thrown away since the block is already present in the disk, and data in the storage server should be read-only.

SSD Block Replacement Policies

According to certain implementations, a Least Recently Used (LRU) replacement policy and a Least Frequently Used (LFU) replacement policy may be appropriate for evicting blocks from the SSD cache. However, there is an interesting design dilemma. Recall that the unit of management of the second-level SSD cache is the optimal block size of the SSD. Since segments may be of variable sizes, a single block in the SSD cache (of optimal block size) may hold multiple segment sizes. Accordingly, how should the LRU list of blocks be updated when a segment that is a small part of a block is accessed; and how should the LFU book-keeping be maintained for multiple segments that may be in the same SSD block? Different suggested replacement policies include:

1. Least Recently Used Block (LRU): In this policy, a segment access may be considered the same as an access to the containing SSD block. Therefore, when any segment in a block is accessed, the block may be moved to the front of an LRU list. When a block needs to be evicted, the last block in the list may be chosen as a victim.
2. Least Frequently Used Block on Average (LFU-Mean): This scheme keeps track of the access count for each segment. When a block needs to be evicted, the average access count of the segments in a block may be calculated, and the block with the least average count may be chosen as a victim.
3. Least Frequently Used Block based on Median (LFU-Median): Similar to the LFU-Mean policy, this scheme keeps track of the access count for each segment as well. Because the mean is not robust to outliers, this policy may use median of the access counts of the segments in a block.

The performance of these SSD block replacement policies is evaluated later in this disclosure.

3.2.4 Difference from ZFS

According to certain implementations, FlashStream may employ an evict-ahead policy similar to the ZFS file system. However, there are fundamental differences between the two policies.

1. ZFS uses FIFO replacement policy for the SSD. FIFO replacement policy generates sequential writes to the SSD and avoids small random writes to the SSD. However, the FIFO replacement policy of ZFS demonstrates a low hit ratio. On the other hand, some implementations of FlashStream may employ different kinds of block replacement policies, and demonstrate a significantly higher hit ratio than ZFS. These experimental results are presented in detail later herein.
2. ZFS does not differentiate the priority of writes and reads to/from the SSD because it was not designed for a video streaming system. Therefore, reads which would be hits in the SSD cache may get queued up behind ongoing writes, and may miss the deadline that reads need to be serviced. On the other hand, some implementations of FlashStream use an admission policy for writes to the SSD to give a higher priority for read requests.
3. FlashStream may decouple monitoring the RAM buffer and writing evicted segments in the ring buffer to the SSD. These two functions are inter-twined in ZFS, and it could lead to lost opportunity. Recall that the evict-ahead policy used in ZFS may simply throw away pages from the RAM buffer even if they have not been written to the SSD. Thus, if the RAM insertion rate from the disk is faster than the rate at which evicted pages can be written to the SSD, then a larger population of evicted pages will be thrown away. On the other hand, in some implementations of FlashStream, the monitor thread and the SSD feed thread may cooperate through the ring buffer and thus there is an opportunity for more evicted segments to be cached in the SSD (despite the evict-ahead policy) even during periods when the RAM insertion rate is higher than the SSD write throughput. The amount of time taken to fill the SSD cache for both systems is described in the experimental performance comparison presented later herein.

TABLE 1

Segment ID

| Video ID | Segment Number | Bitrate |
| --- | --- | --- |

Example Implementation

This section describes the details of an example test FlashStream implementation built for testing. The FlashStream web server was built based on the pion-net open source network library. This example implementation directly manipulates a flash memory SSD as a raw device. In addition, this implementation bypasses the operating system's page cache and manages the RAM for caching segment files on its own. Each video segment is uniquely identified by a tuple: {video id, segment number, bitrate} (see Table 1). The tuple represents the id of a segment. Buffer Manager and SSD Manager are the two of the most import components, and their details are explained in the following subsections.

RAM Buffer Manager

Figure 5:
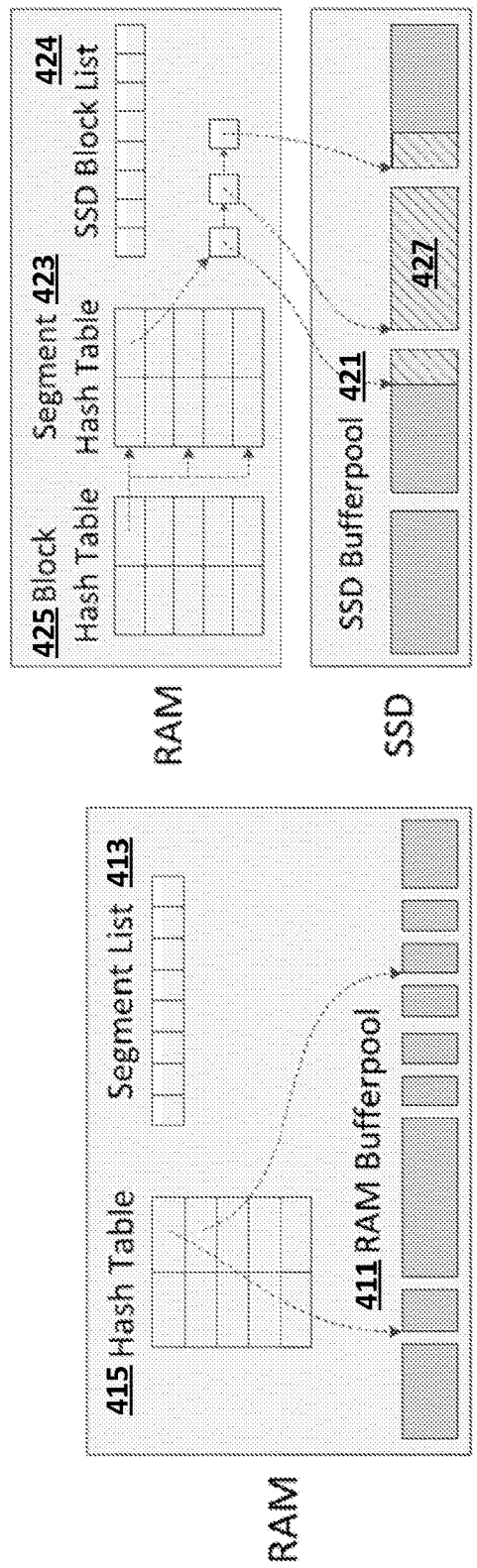
FIGS. 5A-B depict illustrations of data structures used by the RAM Buffer Manager 501A and the SSD Manager 501B, according to an example implementation.

A buffer manager 501A manipulates the available RAM buffer for caching segments. FIG. 5A shows data structures used by the buffer manager. It keeps a pool 411 of cached segments in RAM. For fast lookup, a hash table 415 (key, value store) is maintained in RAM. The key is a segment id, and the value is a tuple: {memory address of the block in RAM, size of the block}. The segment list 413 maintains a list of segment ids for victim selection. The buffer manager in this example implementation uses an LRU replacement policy. Thus, a hit in the RAM results in the segment being moved to the head of the segment list. The last element of the segment list is a victim. When a new segment read from the disk is inserted to the RAM buffer pool, a new entry is inserted into the hash table, and the id of the new segment is inserted at the head of the segment list. If needed, a victim is evicted from the buffer pool and the entry for the victim in the hash table is removed.

SSD Manager

An SSD manager 501B manipulates the available SSD blocks for caching segments. FIG. 5B shows data structures used by the SSD manager. In this example implementation, SSD address space is divided into equal-size blocks, and the block is same as the optimal block size. A block hash table 425 (another key, value store) is maintained to lookup the segments that are stored in a block. The key is an SSD block number, and the value is a list of segment ids that are stored in the same block. A segment hash table 423 is used to lookup the logical block address of the SSD for a segment. When the segment size is larger than the size of an SSD block, then the segment is stored using multiple blocks. In addition, a part of a segment can be written at the end of a block and the rest can be written in the front of another block. Such partial data of a segment is referred to herein as a chunk of the segment. Therefore, the value field in the segment hash table 423 is a list of tuples; each tuple contains {SSD block number, offset into the block, size of a segment chunk}. In FIG. 5B, the shaded blocks 427 in the SSD buffer pool represent a single segment stored in multiple SSD blocks. An SSD block list 424 maintains a list of block numbers for victim selection. The block hash table, the segment hash table, and the SSD block list data structures are stored in physical memory (i.e., RAM) for fast access.

TABLE 2

|  | SSD A | SSD B |
| --- | --- | --- |
| Model | INTEL X25-M G1 | OCZ Core V2 |
| Capacity | 80 GB | 120 GB |
| 4 KB Random Read Throughput | 15.5 MB/S | 14.8 MB/S |
| 4 KB Random Write Throughput | 3.25 MB/S | 0.02 MB/S |

Block Data Layout

Current flash memory SSDs may provide capacity from hundreds of gigabytes to a few terabytes in a single drive. After a system crash or administrative downtime, warming up such a large capacity SSD may take a long time. Since flash memory is typically non-volatile, a warmed up SSD may still serve as a second-level cache despite power failures as long as metadata is available for the segments stored in the SSD as well. To enable recovery of the stored data, some implementations of FlashStream may embed metadata in the SSD blocks.

FIG. 6 depicts an illustration 601 of the data structure of an SSD block, according to an example implementation. As shown in FIG. 6, first SSD block (block number 0) may have a special record, namely, super record 611. The super record includes information about the block size 612 and its checksum 613. In some implementations, only the first SSD block may have the super record. Following the super record, a series of records 621 may be stored. Each record may represent a chunk of a segment. The record may include one or more of segment id 622, number of chunks 623, chunk sequence number 624, chunk size 625, chunk data 626, and checksum 627. From the segment id, the system may figure out the segment that to which the chunk belongs. The number of chunks may indicate how many chunks the segment is divided into, and the chunk sequence number may indicate the order of the chunk in its segment. Checksum 627 may be used to verify the integrity of each record. After system crash, by scanning sequentially all SSD blocks, some implementations of FlashStream may reconstruct the in-memory data structures of the SSD manager (i.e., block hash table and segment hash table).

Utilization-Aware SSD Admission

According to certain implementations, the SSD feed thread 443 may employ an admission mechanism to avoid writes to the SSD when the SSD is busy for serving reads. To measure how busy the SSD device is, /proc/diskstats was used wherein the Linux kernel reports information for each of the storage devices. /proc/diskstats provides the amount of time (in milliseconds) spent doing I/O for each storage device. The number was read at the beginning of a certain epoch and again at the end of the epoch. Because this is an accumulated number, the difference between the two readings gives the time spent in I/O for that device for the current epoch. In some implementations, the ratio of the time spent in I/O to the periodicity of the epoch may serve as a measure of the storage device utilization for that epoch. The SSD feed thread may stop writing data to the SSD when the SSD utilization exceeds a threshold $\lambda$. For the tests described herein, the default threshold used was 60%.

TABLE 3

| Configuration | Web Server | File System |
| --- | --- | --- |
| FlashStream (LRU) | FlashStream | EXT4 |
| FlashStream (LFU-Mean) | FlashStream | EXT4 |
| FlashStream (LFU-Median) | FlashStream | EXT4 |
| ZFS | Apache | ZFS |
| Flashcache | Apache | EXT4 |

Evaluation

In this section, the performance of an example test FlashStream implementation is described. To mimic the request pattern that is fielded and serviced by an HTTP server (i.e., a CDN server) that is serving video segments to distributed clients under the adaptive HTTP streaming mechanism, the workload offered to the FlashStream server was a large number of independent requests from clients. To measure the storage subsystem performance exactly and to avoid network subsystem effects, the workload generator program and the FlashStream server ran on the same machine communicating via a loop-back interface. The machine was a Xeon 2.26 GHz Quad core processor with 8 GB DRAM with Linux kernel 2.6.32 installed on it. A 7200 RPM HDD was used with a capacity of 550 GB.

Five system configurations were evaluated. In addition to an example FlashStream system with three SSD cache replacement policies, the performance was measured of two state-of-the-art multi-tiered storage systems that use flash memory caching, namely, ZFS and Flashcache. Table 3 shows the web server and the file system that are used for each system configuration. The version of Apache web server was 2.2.14, and the version of ZFS was zfs-fuse 0.6.0-1. The flash memory SSDs used for the experiments are listed in Table 2. Note a very low-end SSD (SSD B) was intentional used to show how well FlashStream performs with even low-end SSDs. In the evaluation, FlashStream and ZFS both worked slightly better with SSD B while Flashcache worked better with SSD A. Here, only the results of FlashStream and ZFS used with SSD B and the results of Flashcache used with SSD A are presented. We use only 75 GB out of the total capacity for both SSDs for fair comparison.

TABLE 4

| Name | Bitrates (Kbps) | Source Quality | Length | Genre |
| --- | --- | --- | --- | --- |
| Big Buck Bunny | 200/400/700/1500/2000 | 1080p YUV | 09:46 | Animation |
| Elephants Dream | 200/400/700/1500/2000 | 1080p YUV | 10:54 | Animation |
| Red Bull Playstreets | 200/400/700/1500/2000 | 1080p 6 Mbit AVC | 01:37:28 | Sport |
| The Swiss Account | 200/400/700/1500/2000 | 1080p 6 Mbit AVC | 57:34 | Sport |
| Valkaama | 200/400/700/1400/2000 | 1080p 6 Mbit AVC | 01:33:05 | Movie |
| Of Forest and Men | 200/400/700/1400/2000 | SD | 10:53 | Movie |

Workload

Zipf distribution is generally used in modeling the video access pattern of a video-on-demand (VoD) system, and typically a parameter value between 0.2 and 0.4 is chosen for the distribution. 0.2 was used for the parameter in this test. Dynamic Adaptive Streaming over HTTP (DASH) is an ISO/IEC MPEG standard of the adaptive HTTP streaming paradigm. A DASH dataset was used for this test, which is available in the public domain. As shown in Table 4, the dataset comprises six distinct video objects with five different bitrates for each video. However, for this experiment, a larger dataset was needed comprising 2000 distinct videos. The 2000 videos were generated by uniformly using the six videos and five bitrates. The total size of the dataset was 545 GB. Since five different bitrates were used and videos are encoded with variable bitrate (VBR), the segments of the generated dataset have very different sizes.

For this test, every t seconds (which is the inverse of the request rate), the workload generator selected a video object according to the zipf distribution. Next, it chose a segment of the video object according to a uniform distribution, i.e., each segment of the video object had the same probability. A reasoning behind the uniform distribution is as follows: A large scale adaptive HTTP video streaming service like Netflix relies on the CDN infrastructure that widely deploys web cache servers near the edge networks. For an effective load balancing, a video segment (or object) is replicated to a number of web cache servers, and a client's request for the segment is directed to a web server holding the segment via a request routing technique. There are many different request routing techniques such as DNS routing, HTML rewriting, and anycasting. For this reason, there is no guarantee that a client who downloaded a segment i of a video will download the next segment i+1 from the same server. The next segment request may be directed to a different web server that holds a replica. Therefore, it may be reasonable to assume that the probability that a web server gets a request for a segment of a video object is near or completely random.

The workload generator sent HTTPs request for the chosen segments to the web server. When a segment request was not satisfied (i.e., it is not downloaded to the client) within the segment's play-out time (10 seconds for our test video), the client counted it as a segment deadline miss. A 10-second segment size was chosen because it is the default size used by Apple HTTP Live Streaming. The segment miss ratio was measured against different request rates. The segment miss ratio was defined as the ratio of the number of segment deadline misses to the total number of segment requests for a given request rate. Therefore, requests per second is a control parameter, and the segment miss ratio was the measured figure of merit of the storage subsystem.

Performance Comparison

In this section, the maximum request rate was measured that the five systems can support when the cache is warmed up. Thus, this test may represent the best performance each of the systems can provide. The SSD cache was fully filled by running the workload generator for a sufficient amount of time before each measurement. FlashStream (regardless of replacement policy) took 94 minutes to fully fill up the 75 GB SSD cache, while ZFS took 1200 minutes (20 hours) and Flashcache took 1320 minutes (22 hours) for the same amount of SSD cache. The QoS requirement for video streaming was assumed to be 0% segment miss ratio. By increasing the request rate gradually, the segment miss ratio was measured for each request rate until the segment miss ratio became higher than 0%. In this way, the maximum request rate was obtained for 0% segment miss ratio. Each measurement was run with a different request rate for an hour.

Figure 7A:
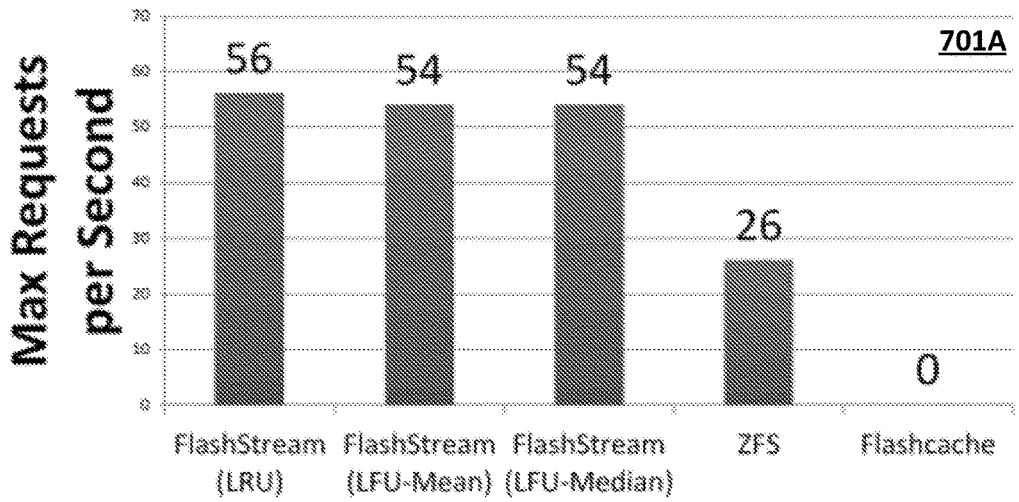
FIGS. 7A-B depict illustrations of maximum request rate (701A) and SSD cache hit ratio (701B) of the five different test system configurations with a warmed up cache for a 0% segment miss ratio, according to an example implementation.
Figure 7B:
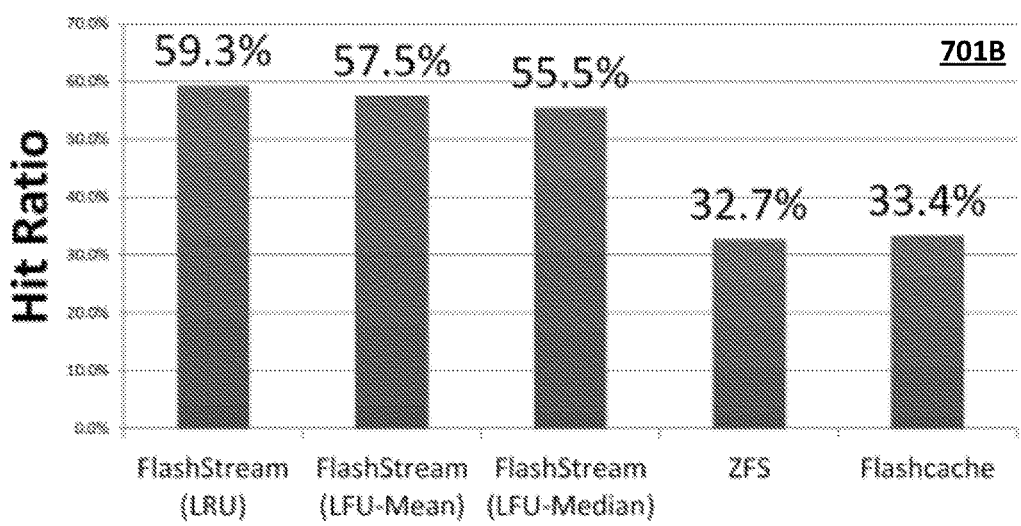

FIGS. 7A-B depict illustrations of maximum request rate (701A) and SSD cache hit ratio (701B) of the five different test system configurations with a warmed up cache for a 0% segment miss ratio, according to an example implementation. As shown in FIG. 7A, FlashStream performed two times better than ZFS. Different SSD cache replacement policies of FlashStream perform similarly while LRU was slightly better than the other two. ZFS was able to support a maximum of 26 requests per second, and Flashcache was unable to support even 1 request per second. Next, the SSD cache hit ratio was measured of the five systems with a warmed up cache when the request rate was the maximum request rate that the systems could support. Each measurement was run for an hour.

FIG. 7B shows that FlashStream with LRU SSD cache replacement policy had the best hit ratio. The other two policies (i.e., LFU-Mean and LFU-Median) showed slightly lower hit ratios than LRU. ZFS's lower maximum request rate as compared to FlashStream correlated directly with ZFS's lower SSD cache hit ratio. Page reads that missed the SSD cache of ZFS went to disks, making the disks overloaded, and therefore causing reads from the disks to miss their deadlines. This result indicates, for the SSD cache, block-level replacement policies (that FlashStream uses) are able to achieve a higher hit ratio than FIFO replacement policy (that ZFS uses), and results in a higher maximum request rate. The reason for the poor performance of Flashcache may be due to the fact that SSD write operations are in the critical path of serving read operations that miss the SSD cache. Thus, though the observed hit ratio for Flashcache was 33.4%, it does not translate to performance (as measured by the maximum request rate) due to the fact that SSD cache reads could be backed up behind long latency SSD cache write operations. FlashStream and ZFS systems address this problem by the evict-ahead mechanism.

Effect of Block Size

In this section, it is described how the choice of the SSD block size affects the FlashStream performance. FlashStream was run with a cold cache for an hour using SSD B. Even though the SSD cache was empty, for this experiment, FlashStream was made to return random free blocks (not in a sequential order) when the SSD feed thread needed to write a block of data to the SSD. This was to demonstrate the effect of the SSD writes with random offsets without fully filling up the SSD cache.

As shown in FIG. 3, the optimal block size of SSD B is 16 MB. FIGS. 8A-B depict illustrations of the effect of optimal (801A) and non-optimal (801B) block sizes on read throughput, write throughput, and utilization of the SSD, according to an example implementation. FIG. 8A shows read throughput, write throughput, and utilization (top to bottom) of the SSD for an hour. From the write throughput graph (middle), it's evident that the system gradually fills segments into the SSD cache. The read throughput graph (top) shows that the read throughput increases as segment requests hit the SSD cache. The utilization graph (bottom) indicates that the SSD device is not overloaded during this period. On the other hand, FIG. 8B presents the same SSD's read throughput, write throughput, and utilization when the block size is 4 KB. SSD B is a low-end SSD that shows very low performance with small random writes (see Table 2). Due to the write amplification triggered by the small block writes with random offsets, the SSD was overloaded during the whole period (100% utilization), and hence provides very low read and write throughput. When the block size was 16 MB, during the one hour period, 70.4% of the total capacity of the SSD was filled, and the SSD hit ratio was 34.4%. On the contrary, when the block size was 4 KB, only 0.08% of the total SSD capacity was written and the SSD hit ratio was 0.65%. To make matters worse, 3% of the read requests that hit the SSD missed their deadline due to the poor read throughput. This experiment underscores the importance of using the optimal block size for the SSD to achieve good performance.

TABLE 5

| Configuration | DRAM | SDD | HDD | RPS | Requests/Joule |
|---|---|---|---|---|---|
| FlashStream | 2 GB | 100 GB | 1 | 64 | 2.91 |
| Conventional A | 12 GB | — | 1 | 34 | 0.57 |
| Conventional B | 2 GB | — | 2 | 48 | 1.50 |

TABLE 6

|  | Capital Cost | Energy Cost |
|---|---|---|
| DRAM | $8/GB | 8 W/DIMM |
| Low-end SSD | $0/8/GB | 2 W/drive |
| 7200 RPM 1 TB HDD | $90/drive | 12 W/drive |

Energy Efficiency

In this section, the energy efficiency is compared for three different systems: An example implementation of FlashStream and two "traditional" systems (one for more DRAM and another for more disks). Table 5 shows the hardware configuration of the three systems. FlashStream had 2 GB DRAM, 100 GB SSD, and a single 7200 RPM 1 TB HDD. Traditional A had 12 GB DRAM and a single 7200 RPM 1 TB HDD. Traditional B had 2 GB DRAM and two 7200 RPM 1 TB HDDs striped per Linux's software RAID-0 configuration. Compared to FlashStream, Traditional A used more DRAM for caching instead of SSDs, while Traditional B used more HDDs for more disk throughput via parallel access. All three systems have the similar total capital cost according to the capital cost of devices in Table 6 (Traditional B was $10 more expensive than the other two). Apache web server was used for traditional systems.

Table 6 shows the energy cost of each device in the active state. Each DRAM module in the test machine was 2 GB, thus 12 GB DRAM corresponds to 6 DIMMs. For FlashStream, the maximum request rate was measured after the SSD was filled up. For traditional systems, a one-hour hour warmup was sufficiently long to fill up the given DRAM. The same workload was used as described above in the section so titled. Table 5 shows that FlashStream achieved the best energy efficiency. FlashStream served 64 requests per second with 0% segment miss ratio and its energy efficiency was 2.91 requests per joule. For Traditional configurations, using additional HDD (i.e., Traditional B) was better than using more DRAM (i.e., Traditional A). FlashStream was 94% more energy efficient than Traditional B. Moreover, Traditional B wastes disk capacity because it used more HDDs only for more throughput; the dataset size was 545 GB while Traditional B has 2 TB HDDs in total. In addition, the cooling costs and the costs associated with rack space in a datacenter were ignored. Implementations of FlashStream that use less DRAM and HDDs but more flash-based SSDs would generate less heat and occupy less volume in a rack. These additional benefits were not accounted for in the analysis.

Example Methods

Figure 9:
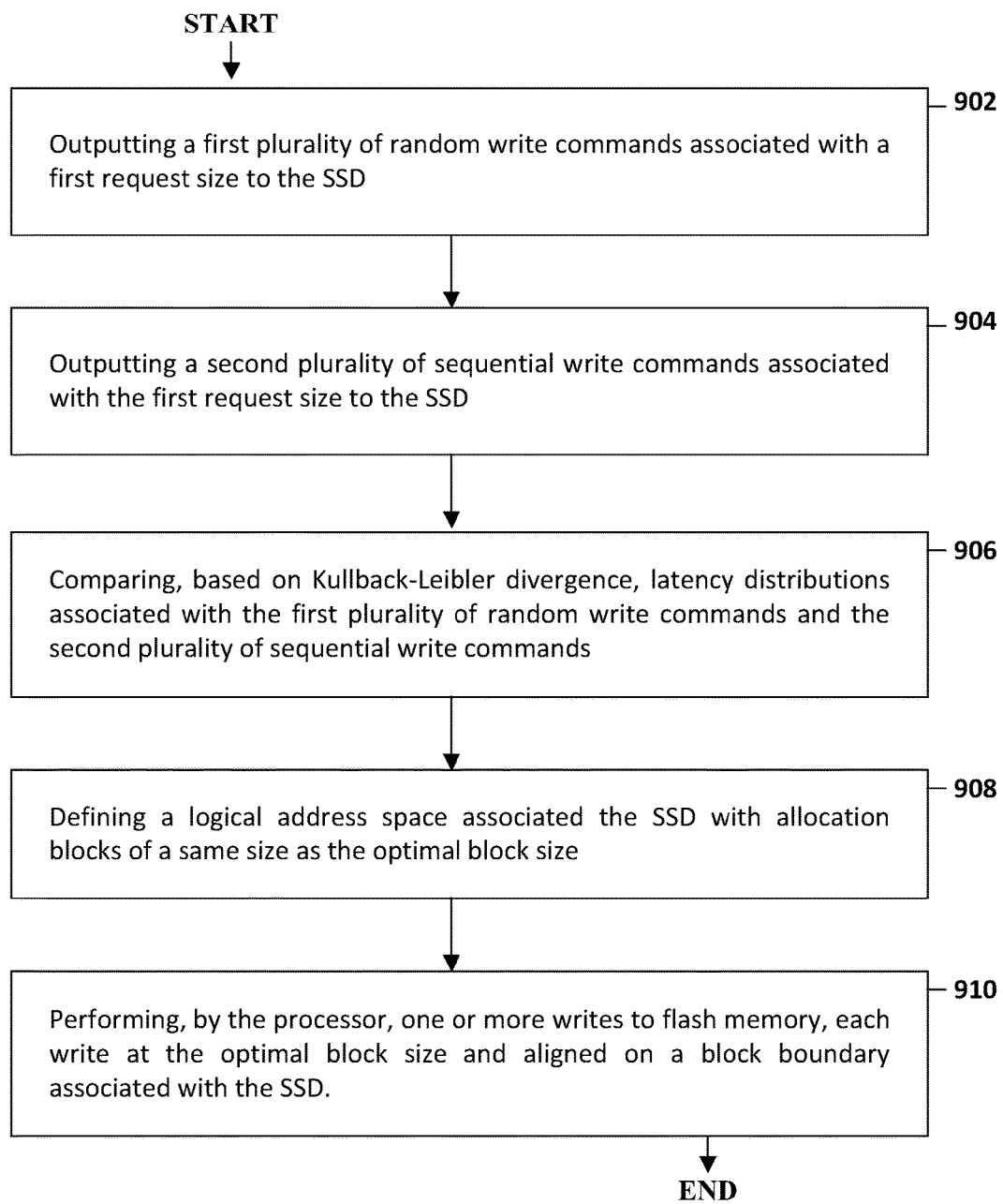
FIG. 9 depicts a flow diagram of a method 900, according to an example implementation.

FIG. 9 depicts a flow diagram of a method 900, according to an example implementation. As shown in FIG. 9, the method 900 starts in block 902, and, according to an example implementation, includes outputting a first plurality of random write commands associated with a first request size to the SSD. In block 904, the method 900 includes outputting a second plurality of sequential write commands associated with the first request size to the SSD. In block 906, the method 900 includes comparing, based on Kullback-Leibler divergence, latency distributions associated with the first plurality of random write commands and the second plurality of random write commands. In block 908, the method 900 includes defining a logical address space associated the SSD with allocation blocks of a same size as the optimal block size. In block 910, the method 900 includes performing, by the processor, one or more writes to flash memory, each write at the optimal block size and aligned on a block boundary associated with the SSD.

It will be understood that the various steps shown in FIG. 9 are illustrative only, and that steps may be removed, other steps may be used, or the order of steps may be modified.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, may be implemented by computer-executable program instructions. Likewise, some blocks of the block diagrams and flow diagrams may not necessarily need to be performed in the order presented, or may not necessarily need to be performed at all, according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that may direct a computer or other programmable data processing apparatus to function in a particular manner, such that the instructions stored in the computer-readable memory produce an article of manufacture including instruction means that implement one or more functions specified in the flow diagram block or blocks. As an example, implementations of the disclosed technology may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

While certain implementations of the disclosed technology have been described in connection with what is presently considered to be the most practical implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A multi-tiered storage system for streaming media content segments comprising:
   a plurality of storage levels including:
      a RAM buffer pool embodied in a first level of RAM cache, the RAM buffer pool comprising an array of memory blocks of various sizes, each block storing data for a media segment file;
      an SSD buffer pool embodied in a second level of SSD cache, wherein an address space associated with the SSD cache is defined by equal-size blocks of an optimal block size associated with the SSD cache, and wherein write operations to the SSD cache are requested with the optimal block size and aligned on a block boundary associated with the SSD cache; and
      a third level of HDD storage;
   a processor operatively coupled to the plurality of storage layers; and
   a RAM monitor thread adapted to monitor a tail part of the RAM buffer pool, the tail part referred to as a monitor room;
   wherein a size associated with the monitor room is about 10% of a total number of segments in the RAM buffer pool;
   wherein media segment requests that miss the RAM cache and SSD cache are served by the HDD storage;
   wherein media segments read from the HDD storage are output to the RAM buffer pool and returned to the processor from the RAM buffer pool; and
   wherein media segments read from the SSD are not inserted into the RAM buffer pool but are returned to the processor.

2. The system of claim 1, wherein the SSD cache is at least partially implemented in MLC flash memory.

3. The system of claim 1, wherein no same data segment is stored in both the RAM cache and the SSD cache.

4. The system of claim 1, wherein segments cached in the RAM buffer pool are ordered according to a least recently used block replacement policy.

5. The system of claim 1 further comprising:
a ring buffer adapted for storing media segments that are candidates for being written into the SSD cache; and
an SSD feed thread adapted to copy segments from the ring buffer to the SSD cache in units of the optimal block size.

6. The system of claim 5, wherein the SSD feed thread is delayed from making write requests to the SSD cache responsive to determining the SSD cache is busy serving read requests.

7. The system of claim 6, wherein the determining the SSD cache is busy serving read requests is based on a predetermined usage threshold.

8. The system of claim 5, wherein the SSD feed thread is further adapted to discard segments from the ring buffer responsive to determining the SSD cache is full.

9. The system of claim 5, wherein blocks are evicted from the SSD cache based on an evict-ahead policy.

10. The system of claim 1, wherein the optimal block size associated with the SSD cache is empirically determined by:
outputting a first plurality of random write commands associated with a first request size to the SSD cache;
outputting a second plurality of sequential write commands associated with the first request size to SSD cache; and
comparing latency distributions associated with the first plurality of random write commands and the second plurality of sequential write commands.

11. The system of claim 1, wherein the SSD cache is at least partially implemented in SLC flash memory.

12. A multi-tiered storage system for streaming media content segments comprising:
a plurality of storage levels including:
a RAM buffer pool embodied in a first level of RAM cache, the RAM buffer pool comprising an array of memory blocks of various sizes, each block storing data for a media segment file;
an SSD buffer pool embodied in a second level of SSD cache, wherein an address space associated with the SSD cache is defined by equal-size blocks of an optimal block size associated with the SSD cache, and wherein write operations to the SSD cache are requested with the optimal block size and aligned on a block boundary associated with the SSD cache; and
a third level of HDD storage; and
a processor operatively coupled to the plurality of storage layers;
wherein media segment requests that miss the RAM cache and SSD cache are served by the HDD storage;
wherein media segments read from the HDD storage are output to the RAM buffer pool and returned to the processor from the RAM buffer pool;
wherein media segments read from the SSD are not inserted into the RAM buffer pool but are returned to the processor; and
wherein the optimal block size associated with the SSD cache is empirically determined by:
outputting a first plurality of random write commands associated with a first request size to the SSD cache;
outputting a second plurality of sequential write commands associated with the first request size to SSD cache; and
comparing latency distributions associated with the first plurality of random write commands and the second plurality of sequential write commands based on Kullback-Leibler divergence.

13. A method of reducing write amplification with SSDs, comprising:
determining, experimentally by a processor, an optimal block size associated with an SSD, the determining comprising:
outputting a first plurality of random write commands associated with a first request size to the SSD;
outputting a second plurality of sequential write commands associated with the first request size to the SSD;
comparing, based on Kullback-Leibler divergence, latency distributions associated with the first plurality of random write commands and the second plurality of sequential write commands;
defining a logical address space associating the SSD with allocation blocks of a same size as the optimal block size; and
performing, by the processor, one or more writes to flash memory, each write at the optimal block size and aligned on a block boundary associated with the SSD.

14. The method of claim 13, wherein the optimal block size is selected responsive to determining a Kullback-Leibler divergence value equal to or less than 0.1.

15. The method of claim 13, wherein the optimal block size is selected responsive to determining a Kullback-Leibler divergence value equal to or less than a predetermined threshold.

16. A non-transitory computer-readable medium that stores instructions that, when executed by a processor of a computing device, causes the computing device to perform a method of reducing write amplification with SSDs, comprising:
determining, experimentally by the processor, an optimal block size associated with an SSD, the determining comprising:
outputting a first plurality of random write commands associated with a first request size to the SSD;
outputting a second plurality of sequential write commands associated with the first request size to the SSD;
comparing, based on Kullback-Leibler divergence, latency distributions associated with the first plurality of random write commands and the second plurality of sequential write commands;
defining a logical address space associating the SSD with allocation blocks of a same size as the optimal block size;
performing, by the processor, one or more writes to flash memory, each write at the optimal block size and aligned on a block boundary associated with the SSD.

* * * * *